United States Patent
Ps et al.

(10) Patent No.: US 10,257,325 B2
(45) Date of Patent: Apr. 9, 2019

(54) SYSTEM, APPARATUS, AND METHOD FOR CONFIGURING PREAMBLE AND SYNCHRONIZING FRAME

(71) Applicant: Samsung Electronics Co., Ltd., Suwon-si (KR)

(72) Inventors: Chandrashekhar Thejaswi Ps, Banglore (IN); Kiran Bynam, Jalahalli (IN); ChangSoon Park, Chungju-si (KR); Young-Jun Hong, Seoul (KR); Manoj Choudhary, Banglore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/016,559

(22) Filed: Feb. 5, 2016

(65) Prior Publication Data
US 2016/0234354 A1    Aug. 11, 2016

(30) Foreign Application Priority Data

Feb. 5, 2015 (IN) .......................... 0579/CHE/2015
Oct. 30, 2015 (KR) ........................ 10-2015-0152038

(51) Int. Cl.
| | |
|---|---|
| H04L 29/06 | (2006.01) |
| H04L 1/16 | (2006.01) |
| H04L 7/04 | (2006.01) |
| H04L 5/00 | (2006.01) |
| H04L 27/26 | (2006.01) |
| H04L 1/00 | (2006.01) |

(52) U.S. Cl.
CPC ............ *H04L 69/22* (2013.01); *H04L 1/1678* (2013.01); *H04L 7/041* (2013.01); *H04L 1/0007* (2013.01); *H04L 5/0048* (2013.01); *H04L 27/2605* (2013.01); *H04L 27/2613* (2013.01)

(58) Field of Classification Search
CPC .............. H04L 27/2613; H04L 5/0048; H04L 27/2605; H04L 1/0007; H04L 27/2656; H04B 1/7073
USPC ......................................................... 375/149
See application file for complete search history.

(56) References Cited

U.S. PATENT DOCUMENTS

| | | |
|---|---|---|
| 7,010,071 B1 | 3/2006 | Michel et al. |
| 7,062,002 B1 | 6/2006 | Michel et al. |
| 7,263,058 B2 | 8/2007 | Joo |
| 7,729,237 B2 | 6/2010 | Lee et al. |
| 8,005,171 B2 | 8/2011 | Lakkis |
| 8,144,746 B2 | 3/2012 | Iwai et al. |
| 8,218,605 B2 | 7/2012 | Wang et al. |
| 8,233,415 B2 | 7/2012 | Birru |
| 8,331,480 B2 | 12/2012 | Zheng et al. |
| 8,385,390 B2 | 2/2013 | Zhang et al. |
| 8,493,924 B2 | 7/2013 | Kwon et al. |
| 8,565,268 B2 | 10/2013 | Kim et al. |
| 8,630,161 B2 | 1/2014 | Moorti et al. |
| 8,638,876 B2 | 1/2014 | Huang et al. |

(Continued)

FOREIGN PATENT DOCUMENTS

KR    10-2013-0073623 A    7/2013

*Primary Examiner* — Leila Malek
(74) *Attorney, Agent, or Firm* — NSIP Law

(57) ABSTRACT

Provided is a method and apparatus of a receiver. The method and apparatus include generating a macro sequence of a length using a complementary-symmetry property. The method and apparatus also obtain a preamble sequence for a communication mode based on the macro sequence.

20 Claims, 11 Drawing Sheets

(56) References Cited

U.S. PATENT DOCUMENTS

| | | | |
|---|---|---|---|
| 2002/0061054 A1* | 5/2002 | Boloorian | H04B 1/7075 |
| | | | 375/149 |
| 2002/0114355 A1 | 8/2002 | Kim et al. | |
| 2006/0274843 A1 | 12/2006 | Koo et al. | |
| 2010/0086076 A1 | 4/2010 | Lakkis | |
| 2010/0124294 A1 | 5/2010 | Birru et al. | |
| 2011/0013547 A1 | 1/2011 | Liao et al. | |
| 2011/0286349 A1* | 11/2011 | Tee | H04W 64/00 |
| | | | 370/252 |
| 2012/0201315 A1* | 8/2012 | Zhang | H04L 1/0046 |
| | | | 375/260 |
| 2012/0219077 A1 | 8/2012 | Chang et al. | |
| 2013/0163572 A1 | 6/2013 | Um et al. | |
| 2013/0230091 A1* | 9/2013 | Chini | H04L 25/03057 |
| | | | 375/233 |
| 2013/0259013 A1* | 10/2013 | Malladi | H04W 56/00 |
| | | | 370/336 |
| 2014/0029602 A1* | 1/2014 | Han | H04L 5/0007 |
| | | | 370/350 |
| 2015/0365977 A1* | 12/2015 | Tabet | H04J 13/0062 |
| | | | 370/330 |

\* cited by examiner

SYSTEM, APPARATUS, AND METHOD FOR CONFIGURING PREAMBLE AND SYNCHRONIZING FRAME

CROSS-REFERENCE TO RELATED APPLICATION(S)

This application claims the benefit under 35 USC 119(a) of Indian Patent Application No. 0579/CHE/2015 filed on Feb. 5, 2015, in the Indian Patent Office, and Korean Patent Application No. 10-2015-0152038 filed on Oct. 30, 2015, in the Korean Intellectual Property Office, the entire disclosures of which are incorporated herein by reference for all purposes.

BACKGROUND

1. Field

The following description relates to frame synchronization in a communication network, and more particularly, to a method, an apparatus, and a system to configure or construct a preamble for frame synchronization and a method, an apparatus, and a system to synchronize the frame in a communication network.

2. Description of Related Art

In communication systems, frame synchronization is an important stage to obtain timing information and marking a beginning of a data field in a given data packet. Frame synchronization is enabled by locating a preamble, which is a unique pattern of a symbol, in a frame before the data field. The preamble is known to a transmitter and a receiver prior to data transmission.

After receiving the packet, the receiver first performs frame synchronization based on information in the preamble, obtains timing information, and then recovers useful data from transmitted data in the data field. The frame synchronization is performed by correlating a received signal with a preamble template. The estimate of the timing information corresponds to a time epoch for which a maximum cross-correlation is achieved. The absence of a frame synchronization phase or the occurrence of an error in the frame synchronization will result in loss of data or packet transmission due to lack of accurate timing information.

Further, the beginning of the data field in the frame is determined as a point in time at which a cross-correlation between the transmitted data and the preamble template reaches a peak value. This is also referred to as a time epoch.

Preamble type setting adds some additional data header strings to help check the Wi-Fi data transmission errors. Short preamble type uses shorter data strings that adds less data to transmit the error redundancy check which means that it is much faster. Long preamble type uses longer data strings which allow for better error checking capability. Accuracy to estimate a correct time epoch is directly proportional to a length of a preamble sequence. In other words, longer preambles may yield more precise frame synchronization. Constructing such longer preamble sequences is complex and sometimes unfeasible. Further, the frame synchronization based on the longer preamble sequences causes high circuit and computational complexity. The computational complexity affects a processing speed and power consumption at a transceiver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of a receiver, the method including: generating a macro sequence of a length using a complementary-symmetry property; and obtaining a preamble sequence for a communication mode based on the macro sequence.

The communication mode may include one of a coherent communication mode and a non-coherent communication mode.

The macro sequence may include codes, and a set of codes, among the codes, is repeated in accordance to the complementary-symmetry property.

The method may also include configuring the preamble sequence to comprise an autocorrelation property to create a correlation peak with an autocorrelation function at a zero lag and zero autocorrelation, wherein the autocorrelation property in the preamble sequence is obtained using a pseudo random sequence.

In accordance with another embodiment, there is provided a method of a receiver, the method including: configuring a preamble sequence using a macro sequence of a length; and synchronizing, in a communication mode, the frame using the preamble sequence, wherein the macro sequence is configured using a complementary-symmetry property.

The synchronizing of the frame may include: calculating a correlation metric between a signal received at the receiver and the preamble sequence; determining correlation peak data from the correlation metric; and calculating a time epoch parameter based on a maximum value of the correlation peak data, wherein the time epoch is a beginning of the frame, and the maximum value is a maximum correlation between the signal and the preamble sequence.

The correlation metric may include a partial correlation metric.

The correlation peak data may include a partial correlation peak data and a complete correlation peak data.

The macro sequence may include codes, and a set of codes among the codes is repeated in accordance with the complementary-symmetry property.

The communication mode may include one of a coherent communication mode and a non-coherent communication mode.

In accordance with an embodiment, there is provided a receiver, including: a generator configured to generate a macro sequence of a length using a complementary-symmetry property; and an output configured to obtain a preamble sequence for a communication mode based on the macro sequence, wherein the macro sequence is generated using the complementary-symmetry property.

The macro sequence may include codes, and a set of codes among the codes is repeated in accordance to the complementary-symmetry property.

The communication mode may include one of a coherent communication mode and a non-coherent communication mode.

In accordance with another embodiment, there is provided a receiver, including: a designer configured to construct a macro sequence of a length; and a synchronizer configured to synchronize a preamble sequence for a communication mode using the macro sequence, wherein the macro sequence is generated using a complementary-symmetry property.

The synchronizer is further configured to calculate a correlation metric between a signal received at the receiver and the preamble sequence, to determine correlation peak data from the correlation metric, and to calculate a time epoch parameter based on a maximum value of the correlation peak data, wherein the time epoch is a beginning of the frame, and the maximum value is a maximum correlation between the signal and the preamble sequence.

The correlation metric may include a partial correlation metric.

The correlation peak data may include at least one of partial correlation peak data and complete correlation peak data.

The macro sequence may include codes, and a set of codes among the codes is repeated in accordance with the complementary-symmetry property.

The communication mode may include one of a coherent communication mode and a non-coherent communication mode.

In accordance with another embodiment, there is provided a non-transitory computer-readable medium storing program instructions for controlling a processor to perform the method described above.

Other features and aspects will be apparent from the following detailed description, the drawings, and the claims.

Figure 1:
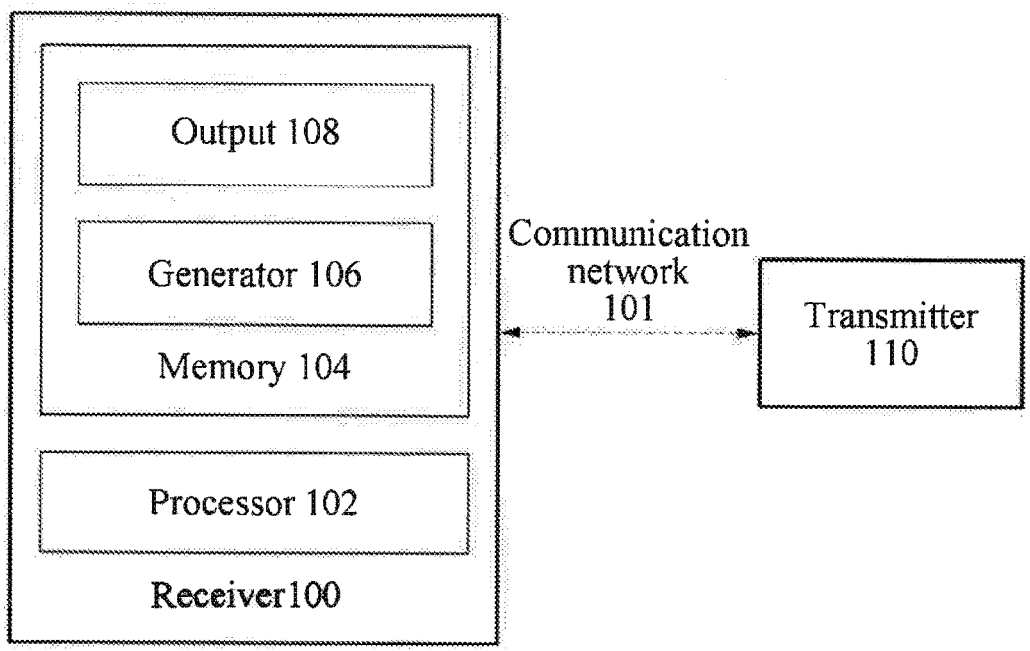
FIG. 1 is a block diagram illustrating a system to construct a preamble in a communication network, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings. Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, the examples will be described with reference to the accompanying drawings, wherein like reference numerals refer to like elements throughout.

The examples relate to a method and system providing frame synchronization in a communication network. The communication network includes a wireless communication network and a wired communication network.

Timing synchronization/frame synchronization is an important component in the communication network to ensure that data transmitted is not lost and adequately processed. Accurate data recovery in a receiver system is dependent on the frame synchronization. The frame synchronization in the communication network is achieved through a preamble sequence.

The preamble sequence, as described in examples herein, is used to synchronize data transmission by indicating an end of header information (preamble) and a start of data, for example, signals transmitted from a transmitter or a transmitter system, for example, a mobile device and/or a base station. The preamble sequence is known as a sequence of data used to identify a beginning of a frame. Thus, the preamble sequence is a fixed symbol sequence that is known a priori at the transmitter and a receiver and is transmitted from the transmitter system at beginning of each packet to mark a beginning of a frame.

In the communication network, the preamble sequence is configured to include an autocorrelation property, which helps to create a large correlation peak with an autocorrelation function at a zero lag and zero autocorrelation. In an embodiment, the autocorrelation property in the preamble sequence is obtained using a pseudo random sequence.

At the receiver system, synchronization of the preamble sequence involves correlating data received from the transmitter with a local preamble template and estimating a preamble epoch by determining a time lag corresponding to the correlation peak. A time epoch marks the beginning of the frame, and is processed to obtain the frame synchronization.

In one example, a preamble sequence is constructed or configured using a macro sequence of a predefined length. The macro sequence is configured using a complementary-symmetry property. The frame synchronization is performed using the preamble sequence and may also be performed by inheriting a complementary-symmetry property of the preamble sequence. The complementary-symmetry property of the preamble sequence is achieved due to the macro sequence having the complementary-symmetry property and used to configure the preamble sequence.

FIG. 1 is a block diagram illustrating a system to construct a preamble in a communication network, in accordance with an embodiment. In accordance with an embodiment, FIG. 1 illustrates a receiver 100 to construct a preamble sequence in a communication network 101. Referring to FIG. 1, the receiver 100 is configured to receive data and to transmit data, and includes a processor 102 and a memory 104. In accordance with an embodiment, the receiver 100 is mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication.

The memory 104 stores a plurality of modules. The modules include a generator 106 and an output 108. The generator 106 and the output 108 are controlled by the processor 102. The modules include a logic or a set of instructions to be executed by the processor 102. The modules may also include one or more hardware elements operating either independently or in combination. The generator 106 is configured to construct or configure a preamble sequence using a macro sequence of a predefined length. The macro sequence is configured using a complementary-symmetry property to provide a complementary-symmetric structure to the macro sequence.

The term "module" used herein is hardware, including a processor or a controller, that performs or executes a function and an operation and includes a non-transitory computer-readable recording medium, for example, a processor or a microprocessor, storing the computer program code to perform the specific function and operation.

The macro sequence includes codes. At least one set of codes among the codes is repeated in accordance to the complementary-symmetry property.

M is the predefined length of the macro sequence, and the macro sequence is constructed or configured using the complementary-symmetry property and using an N-length micro sequence. The micro sequence is a pseudo random sequence having an autocorrelation property so that a highest correlation peak is obtained among correlation peaks. The macro sequence constructed or configured by the generator 106 defines a repetition pattern of micro sequences.

In accordance with an embodiment, the generator 106 sets M to have a power of 2.

When $S[1:M]=[S1, \ldots, SM]$; $S_i \in \{0, 1\}$ $i=1, \ldots M$, denotes an M-length macro sequence where $S_i$ denotes an i-th bit, $S_{[i:K]}=\{S_i, S_{i+1}, \ldots, S_K\} \subset S_{[1:M]}$ is satisfied for all i<K<M. The generator 106 generates a macro sequence using the complementary-symmetry property. A structure of the macro sequence is provided as follows:

When $S[1:M]=[S1, \ldots, SM]$; $Si \in \{0, 1\}$ $i=1, \ldots M$, denotes an M-length macro sequence where Si denotes an i-th bit, $S[i:K]=\{S_i, S_{i+1}, \ldots, Sk\} \subset S[1:M]$ is satisfied for all i<K<M. The generator 106 generates a macro sequence using the complementary-symmetry property. In accordance with an example, a structure of the macro sequence is provided as follows:

$$S[1:1] = S1 = 0$$

$$S[1:2] = [S1, S2] = [S1\overline{S}1]$$

$$S[1:4] = [S[1:2], S[3:4]] = [S[1:2], \overline{S}[1:2]]$$

...

$$S[1:M] = \left[S\left[1:\frac{M}{2}\right], S\left[\frac{M}{2}+1:M\right]\right] = \left[S\left[1:\frac{M}{2}\right], \overline{S}[1:M/2]\right]$$

Where $\overline{S}[i:K]=1-S[i:K]$, denotes a complementary set of $S[i:K]$

The complementary-symmetry property in the structure of the macro sequence imparts robustness in the configuration or construction of the preamble sequence.

As discussed above, the macro sequence is configured or constructed using the micro sequence. The micro sequence is a set of two sequences with autocorrelation and cross-correlation properties to obtain the highest correlation peak.

When C=[c[0] c[1]] denotes a micro sequence, c[0] and c[1] are micro sequences each having a length of N. In general, the micro sequences are generated based on pseudo random sequences. When c[0] is a fixed sequence with a correlation property selected a priori, the micro sequence selected based on c[0]=[$c_1$[0], . . . , $c_N$[0]] is c[0]=1−c[0]. Thus, c=[c[0], 1−c[1]].

The generator 106 modulates the macro sequence using the micro sequences to construct or configure the preamble sequence.

The output 108 uses the macro sequence to obtain the preamble sequence. For the M-length macro sequence, the preamble sequence is expressed as follows:

$$b=S[1:M]*C=[c[S1], c[S2], \ldots, c[SM]]$$

In an embodiment, the preamble length L is expressed as L=MN.

The preamble sequence is constructed or configured by the receiver 100 for a communication mode. The communication mode includes one of a coherent communication mode and a non-coherent communication mode.

Hereinafter, an example to construct or configure a preamble sequence for non-coherent communication at the receiver 100 will be described.

In an example, in response to the length of the macro sequence being M=4 and the length of the micro sequence is N=16, the preamble sequence is expressed as follows:

$$S[1:4]=[1\ 0\ 0\ 1]$$

$$c[1]=[1\ 0\ 0\ 1\ 0\ 1\ 1\ 0\ 0\ 1\ 1\ 0\ 1\ 0\ 0\ 1]$$

$$c[0]=[0\ 1\ 1\ 0\ 1\ 0\ 0\ 1\ 1\ 0\ 0\ 1\ 0\ 1\ 1\ 0]$$

A probability of synchronization error is expressed as follows;

$$PSE=P(\hat{\tau} \neq k | \tau = k)$$

Although the structural elements of the receiver 100 are illustrated and described as separate structural elements, a person of skill in the relevant art will appreciate that each of the structural elements may be combined into one structural element or more structural elements.

Figure 8:
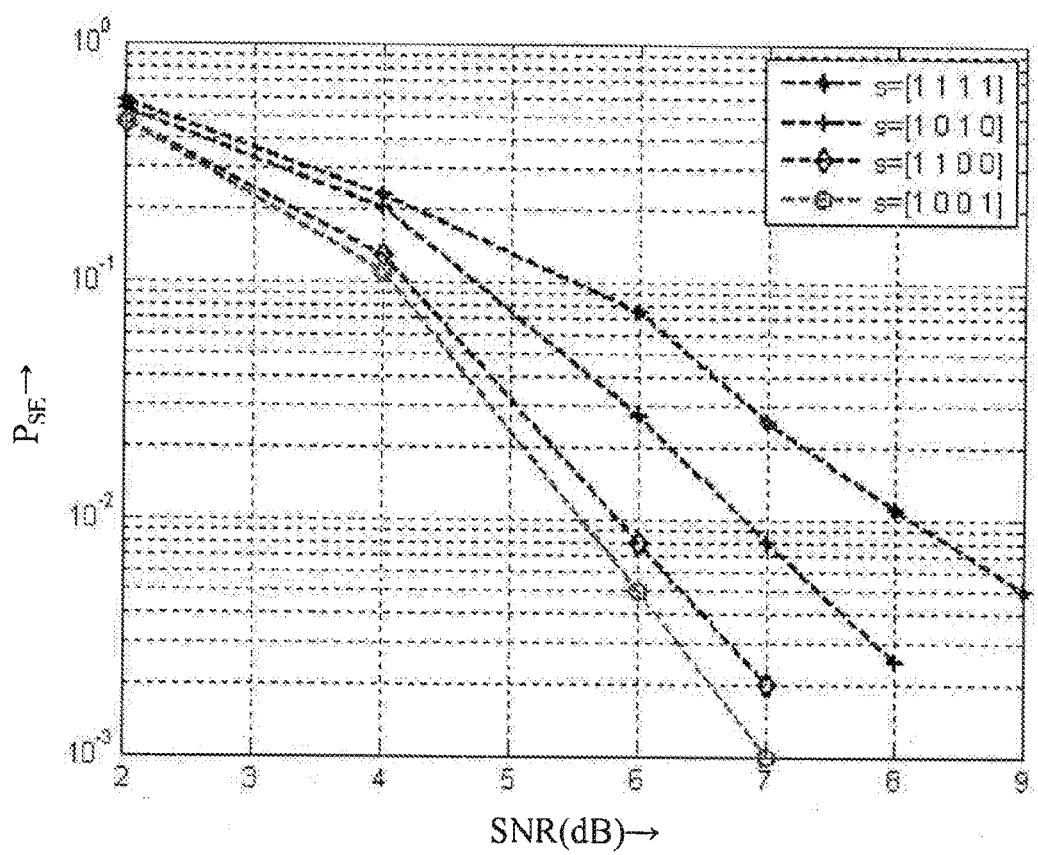
FIG. 8 is a graph showing a probability of a synchronization error versus a signal-to-noise ratio (SNR) for a preamble with macro sequences, in accordance with an embodiment.

FIG. 8 is a graph showing an example of a probability of synchronization error versus a signal-to-noise ratio (SNR) for a preamble with macro sequences. Macro sequence S=[1 0 0 1] outperforms preambles of other combinations. However, the performance of the macro sequence is only an example and is not intended to limit the performance and implementation of other macro sequences.

Figure 9:
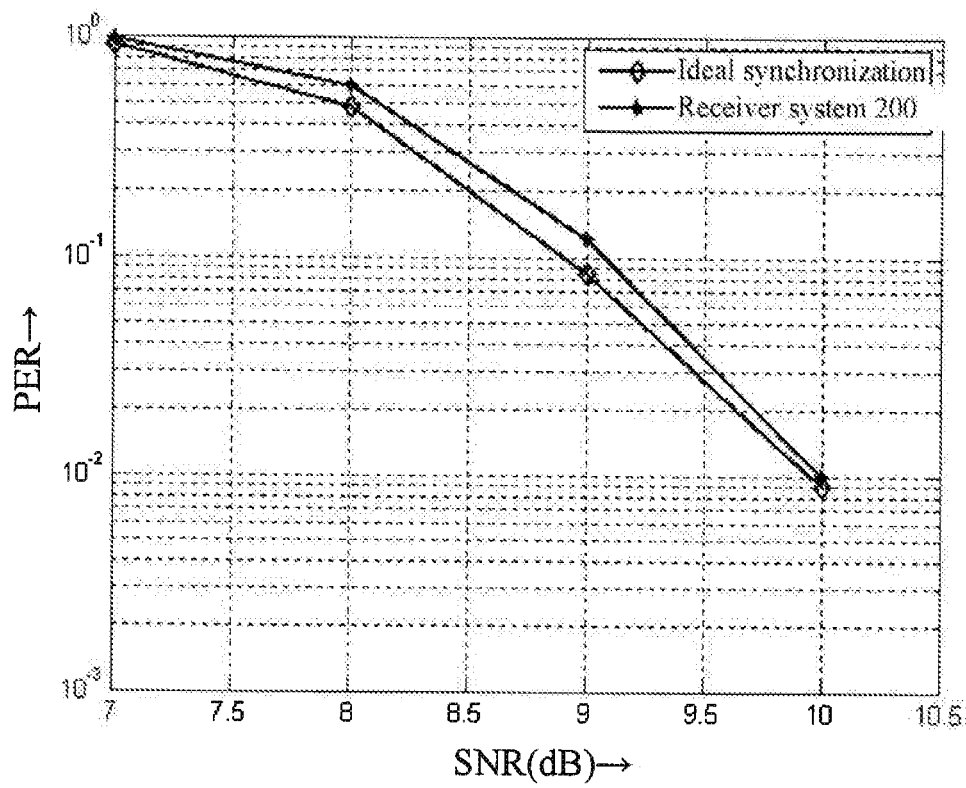
FIG. 9 is a graph showing a packet error rate (PER) versus an SNR for synchronization by a preamble with a length of 16×4, in accordance with an embodiment.
Figure 10:
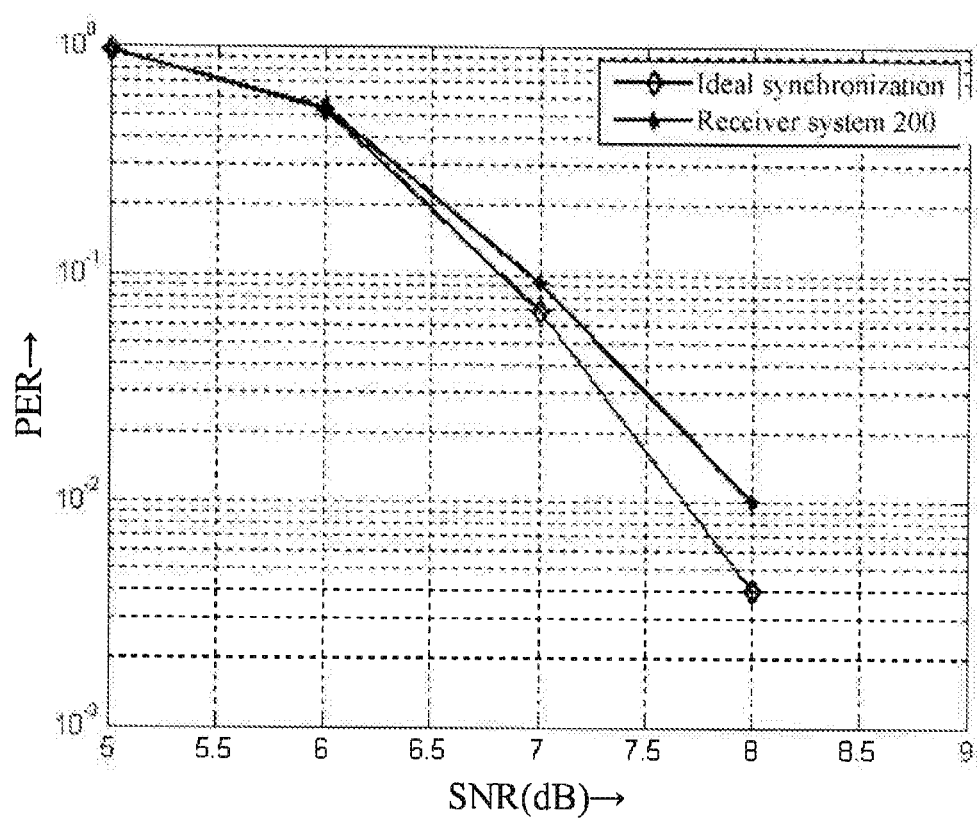
FIG. 10 is a graph showing another PER versus an SNR for synchronization by a preamble with a length of 16×4, in accordance with an embodiment.

FIGS. 9 and 10 are graphs showing examples of a packet error rate (PER) versus an SNR for synchronization by a preamble with a length of 16×4. Referring to the graphs of FIGS. 9 and 10, frame synchronization using a preamble sequence with a complementary-symmetry property has a minimal loss of 0 to 0.3 dB. The minimal loss value is only an example and is not to limit the scope of the embodiment.

Figure 2:
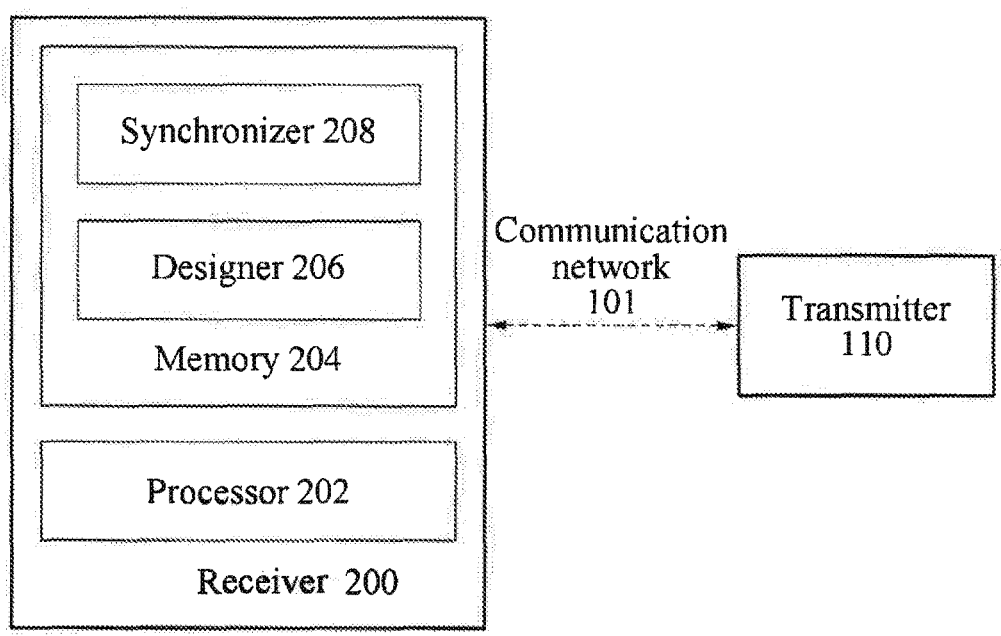
FIG. 2 is a block diagram illustrating a receiver to synchronize a frame in a communication network, in accordance with an embodiment.

FIG. 2 is a block diagram illustrating a receiver to synchronize a frame in a communication network. Referring to FIG. 2, a receiver 200 includes a processor 202 and a memory 204. The memory 204 stores a plurality of modules. The modules includes a designer 206 and a synchronizer 208. The designer 206 and the synchronizer 208 are controlled by the processor 202. The modules may include a logic or a set of instructions to be executed by the processor 202. The modules may also include one or more hardware elements operating either independently or in combination.

The designer 206 is configured to construct or configure a preamble sequence using a macro sequence of a predefined length. The macro sequence is configured or constructed using a complementary-symmetry property. As described above with the receiver 100, the macro sequence is configured using the micro sequences. The aforementioned description relating to the receiver 100 may be applicable to a micro system.

In one example, the length M of the macro sequence is set to have a power of 2.

When S[1:M]=[S1, . . . , SM]; Si∈{0, 1} i=1, . . . M, denotes an M-length macro sequence where Si denotes an i-th bit, S[i:K]={Si, $S_{i+1}$, . . . , $S_k$}⊂S[1:M] is satisfied for all of i<K<M. The designer 206 generates a macro sequence using the complementary symmetry. A structure of the macro sequence is provided as follows:

$$S[1:1] = S1 = 0$$

$$S[1:2] = [S1, S2] = [S1\overline{S}1]$$

$$S[1:4] = [S[1:2], S[3:4]] = [S[1:2], \overline{S}[1:2]]$$

...

$$S[1:M] = \left[S\left[1:\frac{M}{2}\right], S\left[\frac{M}{2}+1:M\right]\right] = \left[S\left[1:\frac{M}{2}\right], \overline{S}[1:M/2]\right]$$

Where $\overline{S}$[i:K]=1−S[i:K], denotes a complementary set of S[i:K]

In response to C=[c[0] c[1]] denoting a micro sequence, c[0] and c[1] is micro sequences each having a length of N. In general, the micro sequences are generated based on pseudo-random sequences. When c[0] is a fixed sequence with a correlation property selected a priori, the micro sequence selected based on c[0]=[$c_1$[0], . . . , $c_N$[0]] is c[0]=1−c[0]. Thus, c=[c[0], 1−c[1]].

The designer 206 modulates the macro sequence using the micro sequences to construct or configure the preamble sequence. For the M-length macro sequence, the preamble sequence is expressed as follows:

$$b=S[1:M]*C=[c[S1], c[S2], \ldots, c[SM]]$$

In an example, the preamble length L is expressed as L=MN.

FIGS. 3 through 6 are graphs showing an autocorrelation property of a preamble for a plurality of patterns of a macro sequence with the length of M where M=8, in accordance with an embodiment. In an example, in the graphs, a horizontal axis denotes a time lag and a vertical axis denotes an autocorrelation factor (AFC).

Figure 3:
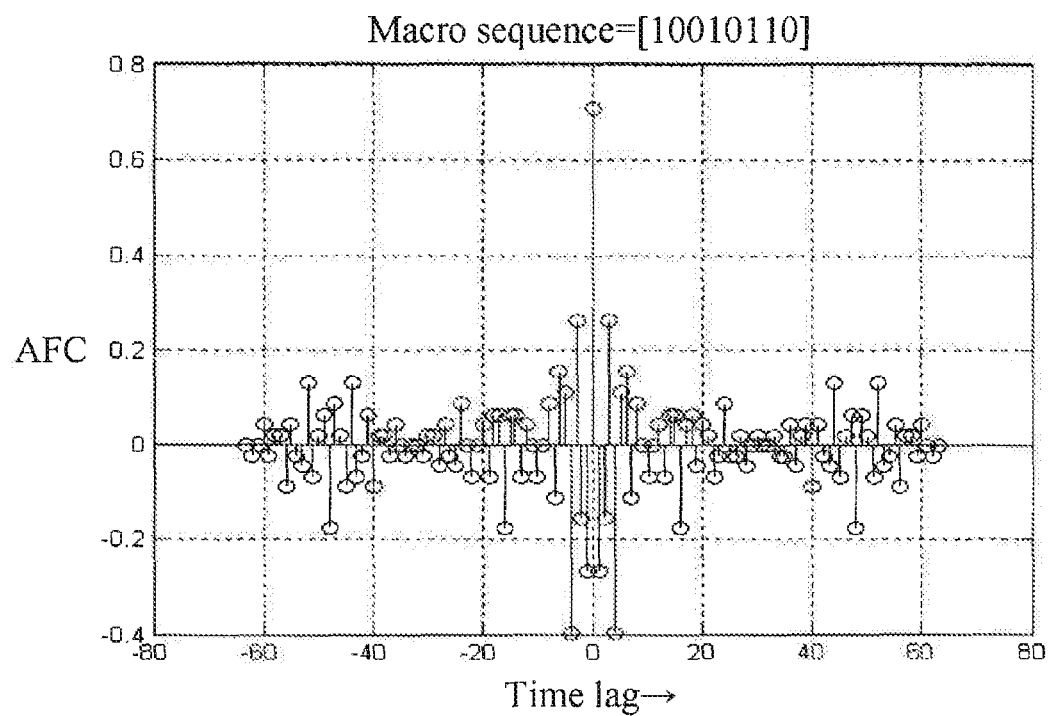
FIG. 3 is a graph showing correlation peaks for a preamble sequence, in accordance with an embodiment.

FIG. 3 is a graph showing correlation peaks for a preamble sequence [10010110], in accordance with an embodiment.

Figure 4:
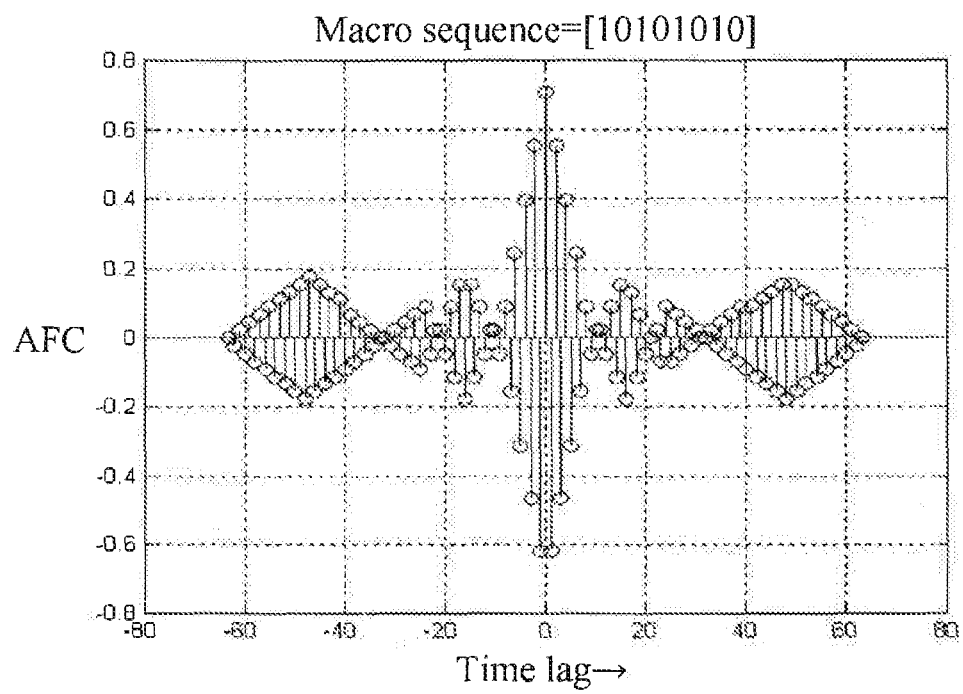
FIG. 4 is a graph showing another correlation of peaks for a preamble sequence, in accordance with an embodiment.

FIG. 4 is a graph showing another correlation of peaks for a preamble sequence [10101010], in accordance with an embodiment.

Figure 5:
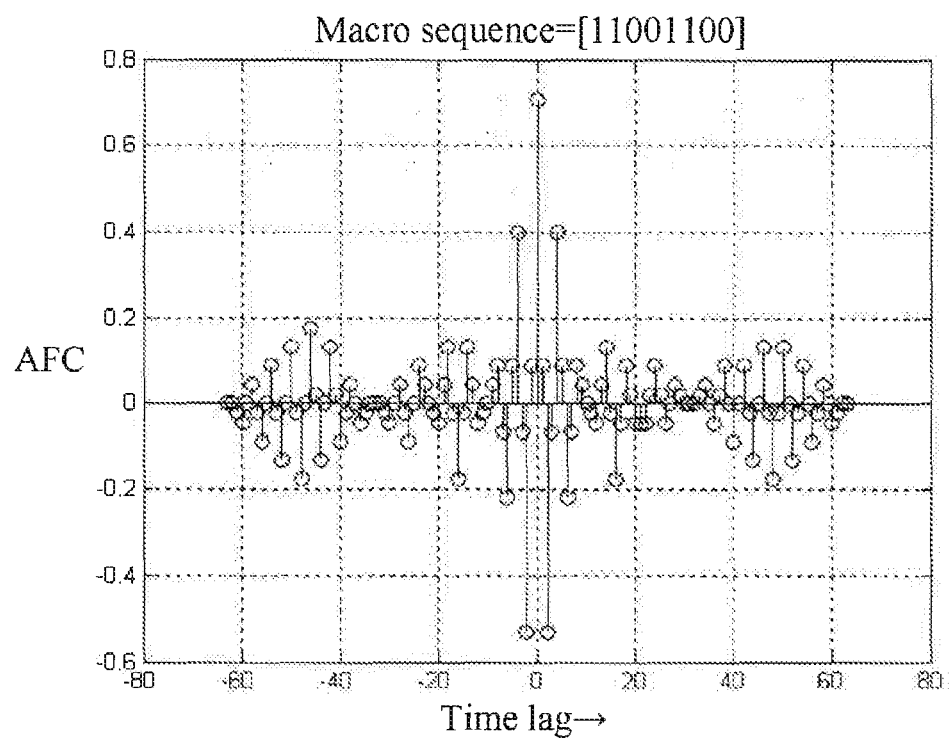
FIG. 5 is a graph showing another correlation of peaks for a preamble sequence, in accordance with an embodiment.

FIG. 5 is a graph showing another correlation of peaks for a preamble sequence [11001100], in accordance with an embodiment.

Figure 6:
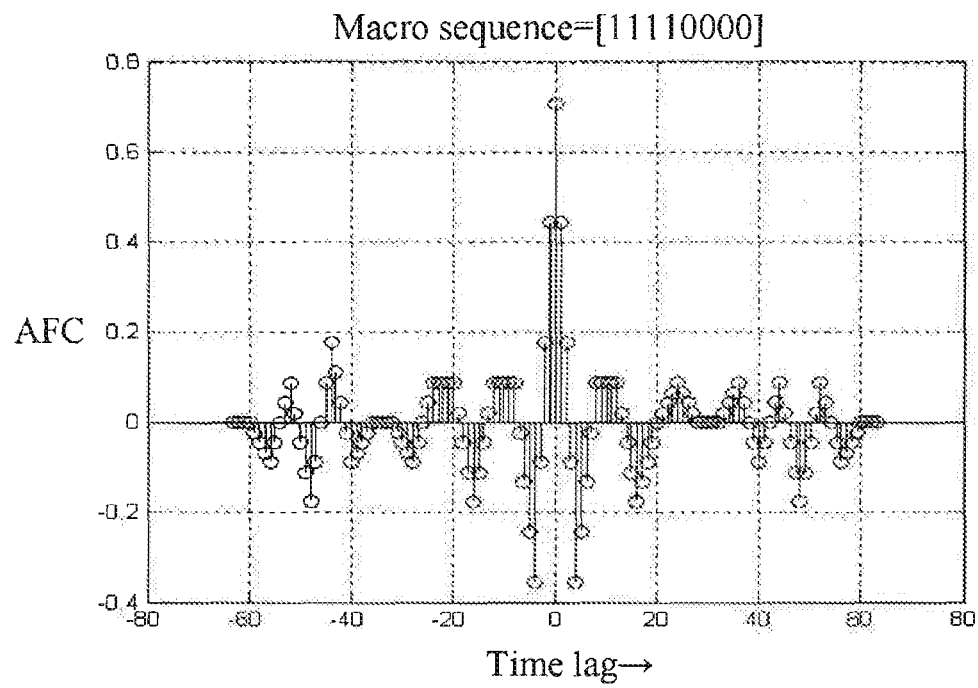
FIG. 6 is a graph showing another correlation of peaks for a preamble sequence, in accordance with an embodiment.

FIG. 6 is a graph showing another correlation of peaks for a preamble sequence [11110000], in accordance with an embodiment.

Referring to the graphs of FIGS. 3 through 6, it can be known that a complementary-symmetry property of the macro sequence, in accordance with an embodiment, yields a highest correlation peak.

Once the preamble sequence is constructed or configured, the synchronizer 208 synchronizes the frame using the preamble sequence.

In response to {y(n)} denoting a baseband signal equivalent to a signal received at the receiver 200 based on a timing to be extracted, timings include correlation timings between the received signal and a preamble correlation template. In an example, $\hat{b}$ denotes the preamble correlation template at the receiver 200 where $\hat{b}=2|b|-1$.

The synchronizer 208 calculates a correlation metric. The correlation metric is defined as follows:

$$Cp(t) = \hat{b} \otimes [y(\tau), \ldots, y(\tau+L-1)] = \Sigma_{i=1}^{L} \hat{b}i \, y(\tau+i-1)$$

A time epoch calculated by the synchronizer 208 is expressed as follows:

$$\hat{\tau} = \arg\max Cp(t)$$

The preamble sequence having the complementary-symmetry property and used for synchronizing the frame reduces the complexity by generating the highest correlation peak.

Figure 7:
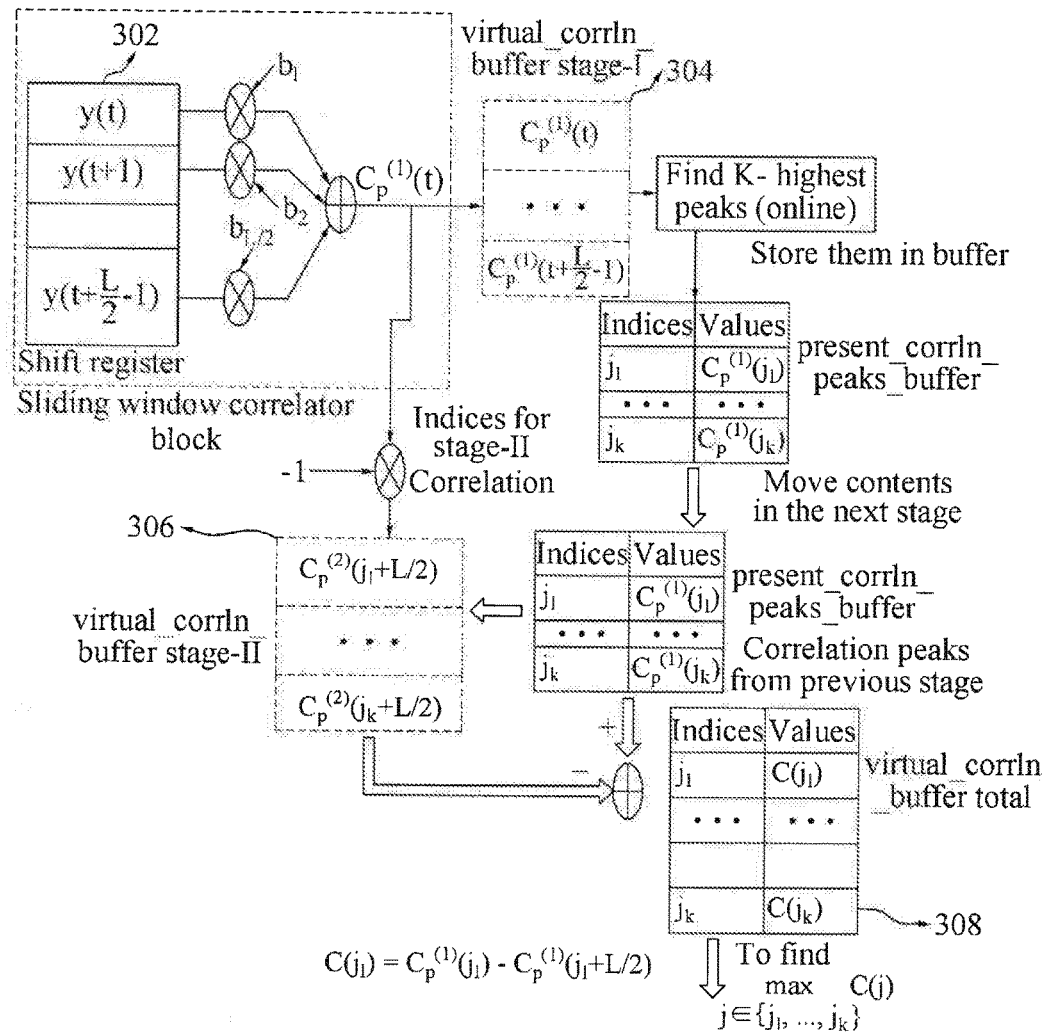
FIG. 7 is a circuit diagram illustrating a circuitry to synchronize a frame, in accordance with an embodiment.

Referring to FIG. 7, the synchronizer 208 calculates a correlation metric and a time lag corresponding to the correlation metric in operation 302. Using the complementary-symmetry property, the preamble correlation template pre-stored at the receiver 200 is expressed as follows:

$$\hat{b} = 2|b| - 1 = \left[\hat{b}_{[1:\frac{L}{2}]}; \hat{b}_{[\frac{L}{2}+1:L]}\right] = \left[\hat{b}_{[1:\frac{L}{2}]}; \hat{b}_{[1:\frac{L}{2}]}\right].$$

In accordance with an embodiment, for a time lag t, the calculation of the correlation metric by the synchronizer 208 is performed in the following stages:

Stage-I: Calculation of partial correlation metrics and partial correlation peaks (as shown in operation 304 of FIG. 7).

Stage-II: Calculation of partial correlation metrics and complete correlation peaks (as shown in operation 306 of FIG. 7).

The partial correlation metric is defined as follows:

Stage-I partial correlation metric:

$$Cp^{(1)}(t) = \hat{b}\left[1:\frac{L}{2}\right] y\left[\tau:\tau+\frac{L}{2}-1\right]$$

Stage-II partial correlation metric:

$$Cp^{(2)}(t) = \hat{b}\left[\frac{L}{2}+1:L\right] y\left[\tau:\tau+\frac{L}{2}-1\right]$$

The correlation metric is calculated as follows:

$$C(t) = \hat{b}\left[1:\frac{L}{2}\right] y\left[\tau:\tau+\frac{L}{2}-1\right] + \hat{b}\left[\frac{L}{2}+1:L\right] y\left[\tau:\tau+\frac{L}{2}-1\right] = Cp^{(1)}(t) = Cp^{(2)}(t)$$

The calculation of the correlation metric using the preamble sequence, as proposed in the embodiments presented herein, enables the correlation metric to be simply calculated due to the complementary-symmetry property of the preamble sequence. By applying a configuration to provide the preamble sequence with the complementary-symmetric property and the calculation of the correlation metric, $\hat{b}[L/2+1:L] = -\hat{b}[1:L/2]$ are obtained.

Further, by applying $$\hat{b}_{[L/2+1:L]} = -\hat{b}_{[1:L/2]}$$

to $$C(t) = \hat{b}\left[1:\frac{L}{2}\right] y\left[\tau:\tau+\frac{L}{2}-1\right] + \hat{b}\left[\frac{L}{2}+1:L\right] y\left[\tau:\tau+\frac{L}{2}-1\right] =$$
$$Cp^{(1)}(t) + Cp^{(2)}(t),$$

$$C(t) = Cp^{(1)}(t) - Cp^{(1)}(t+L/2)$$

is obtained.

By calculating the correlation metric as above, the calculation complexity is prevented or, at least, reduced.

Referring to FIG. 7, the synchronizer 208 uses the preamble sequence to synchronize the frame to provide accurate recovery of a signal at the receiver 200.

In response to D denoting a number of received samples over which synchronization is to be performed, D is segmented into B blocks. Each block among the B blocks has a length of L/2 where K<L/2 denotes an integer fixed a priori.

Hereinafter, the synchronizer 208 is described performing calculations using the preamble sequence configured or constructed by the designer 206 will be described.

For block b=1 to B, Stage-I correlation is performed as follows:

$$Cp^{(1)}((b-1)L+i); i=1, \ldots, L/2.$$

K having a highest correlation peak and a corresponding index is found as follows:

Find $j1, j2, \ldots, j_K \in \{1, \ldots, L/2\}$ such that $Cp^{(1)}(j1)$
$\geq Cp^{(1)}(j2) \geq \ldots \geq Cp^{(1)}(jk)$ For j1, j2 . . . , jk, Stage-I correlation is performed as follows:

$$Cp^{(2)}(j); j=j1, j2, \ldots, jk$$

Total correlation peaks is calculated (as illustrated in operation 308 of FIG. 7):

$$C(j) = Cp^{(1)}(j) + Cp^{(2)}(j+L/2); j=j1, j2, \ldots, jk.$$

The index corresponding to the highest peak is found as follows:

$$J\max(b) = \arg\max C(j), j \in \{j1, j2, \ldots, jk\}$$

A time epoch is estimated based on a maximum value of all peaks as follows:

$$\hat{\tau} = \arg\max C(k), k \in \{j\max(1), \ldots, j\max(B)\}$$

The time epoch calculated by the synchronizer 208 indicates a beginning of the frame. A maximum value, that is, a highest value, of the correlation metric indicates a maximum correlation between the signal received from a transmitter 110 and the preamble sequence.

Table 1 and Table 2 provide comparative analysis results for typical frame synchronization using the receiver 200 and a peak-search method.

Table 1 shows comparison results of hardware complexity.

TABLE 1

| Algorithm | Multipliers | Adders | Registers |
|---|---|---|---|
| Peak-search (optimal) | L | L − 1 | L |
| Receiver system 200 | L/2 + 1 | L/2 | L/2 + 4K + 2 |

Table 2 shows comparison results of computational complexity.

TABLE 2

| Algorithm | Multiplications | Additions | Comparisons |
|---|---|---|---|
| Peak-search (optimal) | DL | D(L − 1) | D |
| Receiver 200 | LD/2 + ([2D/L] − 1)*K | LD/2 + ([2D/L] − 1)*K | DK |

The synchronizer 208 provides synchronization for a communication mode. The communication mode includes one of a coherent communication mode and a non-coherent communication mode. For non-coherent communication, a macro sequence used to construct or configure a preamble sequence is non-negative.

An example to construct or configure a preamble sequence in a non-coherent communication mode is the same as a description presented above with reference to the receiver 100.

Figure 11:
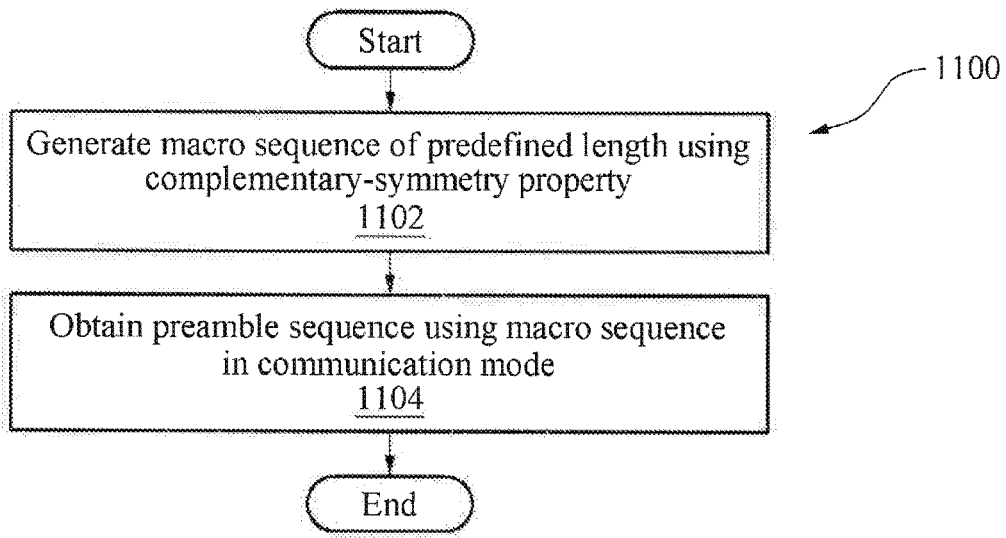
FIG. 11 is a flowchart illustrating a method to construct a preamble sequence in a communication network, in accordance with an embodiment.

FIG. 11 is a flowchart illustrating a method 1100 to construct or configure a preamble sequence in a communication network, for example, the communication network 101 of FIG. 1. As illustrated in FIGS. 1 and 2, the communication network 101 includes a wireless communication network and a wired communication network. In accordance with an alternative configuration, the method 1100 of FIG. 11 may be used in wireless communication networks.

Referring to FIG. 11, in operation 1102, the method 1100, using the generator 106 of FIG. 1, generates a macro sequence of a predefined length using a complementary-symmetry property.

In operation 1102, the macro sequence includes a plurality of codes. At least one set of codes, among the codes, is repeated in accordance to the complementary-symmetry property. In one example, the codes are micro sequences and one set of code, among the codes, is one micro sequence.

When M denotes the predefined length of the macro sequence, the macro sequence is constructed or configured using the complementary-symmetry property and using an N-length micro sequence. The aforementioned description relating to the receiver 100 and the receiver 200 is applicable to the macro sequence and the micro sequence.

In one embodiment, the method 1100 sets M to have a power of 2.

When $S[1:M]=[S1, \ldots, SM]$; $Si \in \{0, 1\}$ $i=1, \ldots M$, denotes the M-length macro sequence, where Si denotes an i-th bit, $S[i:K]=\{Si, S_{i+1}, \ldots, S_k\} \subset S[1:M]$ is satisfied for all i<K<M. The method, through the generator 106, generates the macro sequence using the complementary symmetry property. A structure of the macro sequence is provided as follows:

$$S[1:1] = S1 = 0$$

$$S[1:2] = [S1, S2] = [S1 \overline{S}1]$$

$$S[1:4] = [S[1:2], S[3:4]] = [S[1:2], \overline{S}[1:2]]$$

...

$$S[1:M] = \left[S\left[1:\frac{M}{2}\right], S\left[\frac{M}{2}+1:M\right]\right] = \left[S\left[1:\frac{M}{2}\right], \overline{S}[1:M/2]\right]$$

Where $\overline{S}[i:K]=1-S[i:K]$, denotes a complementary set of $S[i:K]$

As described above in operation 1102, the method 1100 constructs or configures the macro sequence using the micro sequence. The micro sequence is a set of two sequences with autocorrelation and cross-correlation properties to obtain the highest correlation peak.

When $C=[c[0] \ c[1]]$ denotes a micro sequence, $c[0]$ and $c[1]$ are micro sequences, each having a length of N. In general, the micro sequences are generated based on pseudo random sequences. When $c[0]$ is a fixed sequence with a correlation property selected a priori, the micro sequence selected based on $c[0]=[c_1[0], \ldots, c_N[0]]$ is $c[0]=1-c[0]$. Thus, $c=[c[0], 1-c[1]]$.

In operation 1104, the method 1100, through the output 108 of FIG. 1, obtains a preamble sequence using the macro sequence.

In operation 1104, the method 1100, through the output 108, modulates the macro sequence using the micro sequences to construct or configure the preamble sequence.

For the M-length macro sequence, the preamble sequence is expressed as follows:

$$b=S[1:M]*C=[c[S1],c[S2], \ldots ,c[SM]]$$

In an embodiment, the preamble length L is expressed as L=MN.

The method 1100 constructs or configured the preamble sequence for a communication mode. The communication mode includes one of a coherent communication mode and a non-coherent communication mode.

Hereinafter, an example of constructing or configuring a preamble sequence at the receiver 100 in the communication network 101 will be described.

Figure 12:
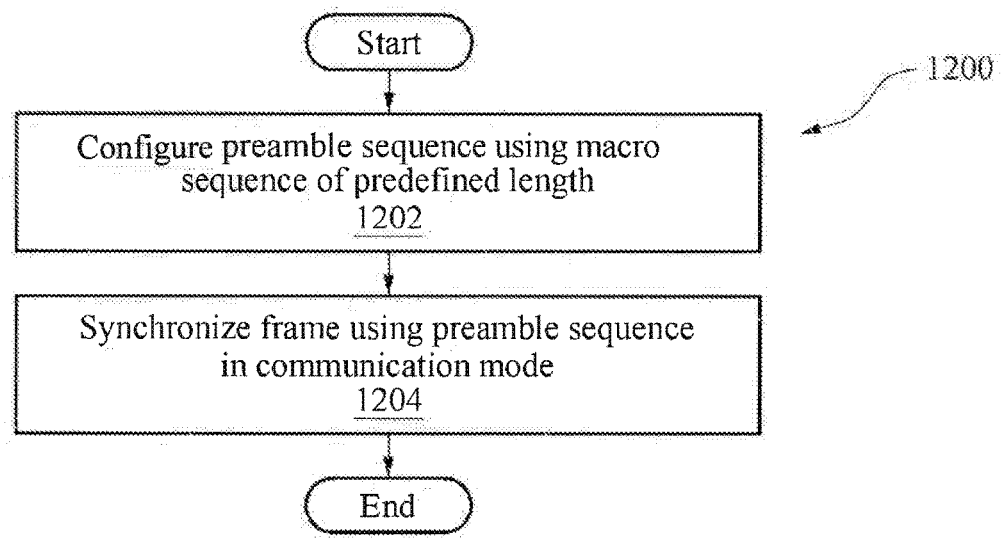
FIG. 12 is a flowchart illustrating a method to synchronize a frame in a communication network, in accordance with an embodiment.
Figure 13:
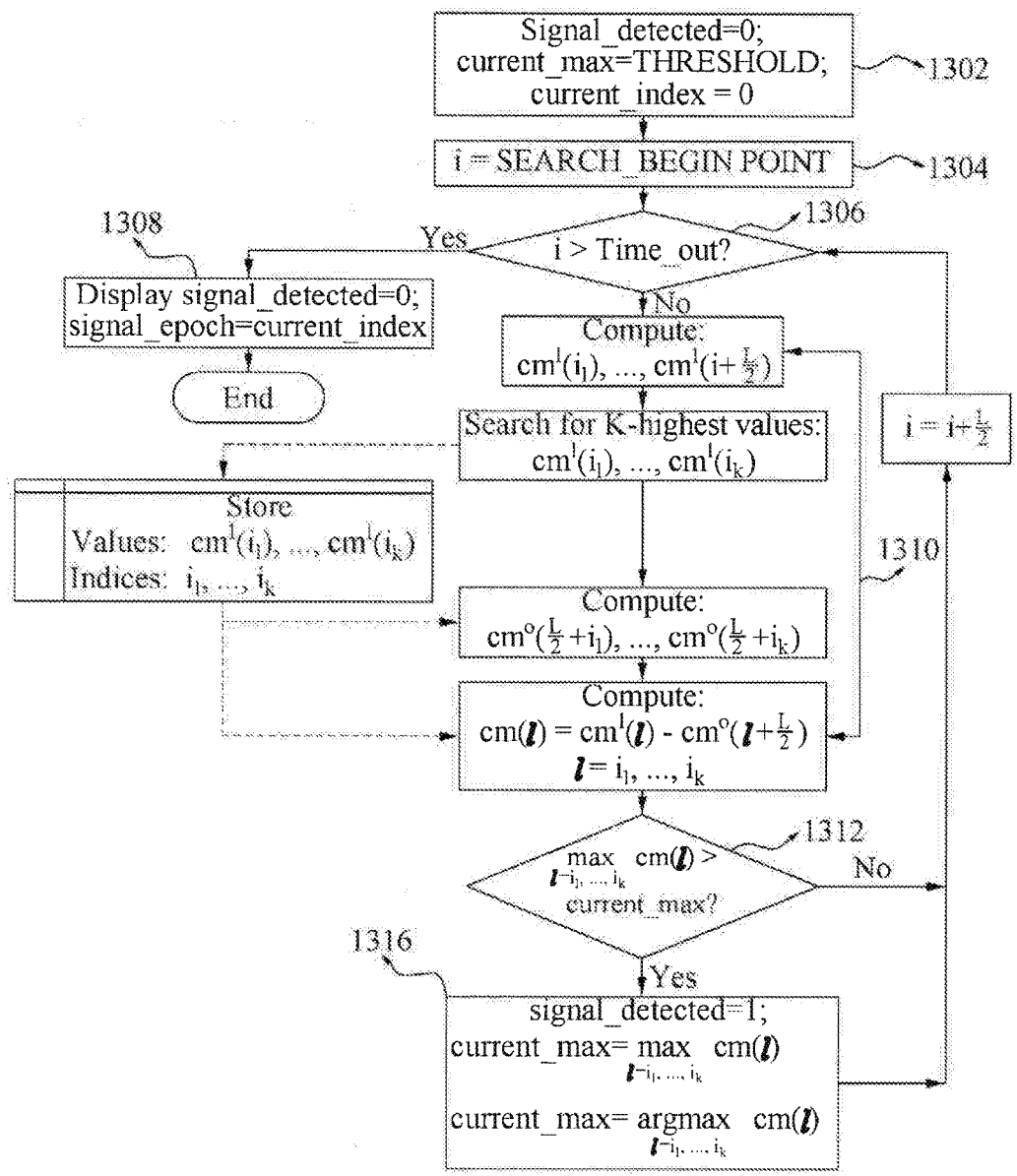
FIG. 13 is a flowchart illustrating another method to synchronize a frame in a communication network, in accordance with an embodiment.

FIGS. 12 and 13 are flowcharts illustrating a method 1200 of synchronizing a frame in a communication network, for example, the communication network 101 of FIG. 1, in accordance with embodiments. As illustrated in FIGS. 1 and 2, the communication network 101 includes a wireless communication network and a wired communication network.

Referring to FIG. 12, in operation 1202, the method 1200 constructs or configures a preamble sequence using a macro sequence of a predefined length. The macro sequence may be constructed or configured using a complementary-symmetry property through, for example, the designer 206 of FIG. 2. The descriptions presented above relating to the receiver 100, the receiver system 200, and the method 1100 are applicable to constructing or configuring the preamble sequence.

The length of the macro sequence M is set to have a power of 2.

When $S[1:M]=[S1, \ldots, SM]$; $Si \in \{0, 1\}$ $i=1, \ldots M$ denotes an M-length macro sequence, where Si denotes an i-th bit, $S[i:K]=\{Si, S_{i+1}, \ldots, S_k\} \subset S[1:M]$ is satisfied for all i<K<M. The generator 106 generates the macro sequence using the complementary symmetry. A structure of the macro sequence is provided as follows:

$$S[1:1] = S1 = 0$$

$$S[1:2] = [S1, S2] = [S1\overline{S1}]$$

$$S[1:4] = [S[1:2], S[3:4]] = [S[1:2], \overline{S}[1:2]]$$

...

$$S[1:M] = \left[S\left[1:\frac{M}{2}\right], S\left[\frac{M}{2}+1:M\right]\right] = \left[S\left[1:\frac{M}{2}\right], \overline{S}[1:M/2]\right]$$

Where $\overline{S}[i:K]=1-S[i:K]$, denotes a complementary set of $S[i:K]$

When $C=[c[0]\ c[1]]$ denotes a micro sequence, $c[0]$ and $c[1]$ are micro sequences, each having a length of N. In general, the micro sequences are generated based on pseudo random sequences. When $c[0]$ is a fixed sequence with a correlation property selected a priori, the micro sequence selected based on $c[0]=[c_1[0], \ldots, c_N[0]]$ is $c[0]=1-c[0]$. Thus, $c=[c[0], 1-c[1]]$.

The macro sequence is constructed or configured using the micro sequences to construct or configure the preamble sequence. For the M-length macro sequence, the preamble sequence is expressed as follows:

$$b=S\_[1:M]*C=[c[S\_1], c[S\_2], \ldots, c[S\_M]]$$

In an embodiment, the preamble length L is expressed as L=MN.

FIGS. 3 through 6 are graphs showing examples of an autocorrelation property of a preamble for patterns of a macro sequence with the length of M, where M=8, in accordance with embodiments.

Referring to the graphs of FIGS. 3 through 6, a complementary-symmetry property of the macro sequence, as describe in the various embodiments herein, yields such a correlation property that provides high correlation peaks.

In operation 1204, the method 1200 synchronizes a frame using the preamble sequence constructed or configured in operation 1202. The synchronization is performed in a communication mode. For example, the synchronizer 208 of FIG. 2 performs the synchronization.

FIG. 13 is a flowchart illustrating an example of the method 1200 to synchronize a frame, in accordance with an embodiment. In operation 1302, the transmitter 110 transmits a signal. In operation 1304, the receiver 200 receives the signal and starts searching for a beginning or a start point of the frame. If time i exceeds Time_Out in operation 1306, the signal is not detected in operation 1308.

In operation 1304, the frame is synchronized using the preamble sequence constructed or configured in operation 1302. Once the preamble sequence is constructed or configured, the synchronizer 208 synchronizes the frame using the preamble sequence.

When $\{y(n)\}$ denotes a baseband signal equivalent to a signal received at the receiver 200 based on a timing to be extracted. In one example, the timing includes a correlation timing between the received signal and a preamble correlation template. In an example, b denotes the preamble correlation template at the receiver 200, where $\hat{b}=2|b|-1$. Typically, the correlation metric is defined as follows:

$$Cp(t)=b \otimes [y(\tau), \ldots, y(\tau+L-1)]=\Sigma_{i=1}^{L} \hat{b}_i y(\tau+i-1)$$

A time epoch is expressed as follows:

$$\hat{\tau}=\mathrm{argmax} Cp(t)$$

In operation 1310, the method 1200 calculates correlation metrics and correlation peaks and searches for a highest k-value for the receiver 200.

Referring again to FIG. 7, using the complementary-symmetry property, the preamble correlation is expressed as follows:

$$\hat{b} = 2|b|-1 = \left[\hat{b}_{\left[1:\frac{L}{2}\right]}; \hat{b}_{\left[\frac{L}{2}+1:L\right]}\right] = \left[\hat{b}_{\left[1:\frac{L}{2}\right]}; -\hat{b}_{\left[1:\frac{L}{2}\right]}\right].$$

For a time lag t, the calculation of the correlation metric is performed in the following stages:

Stage-I: Calculation of partial correlation metrics and partial correlation peaks.

Stage-II: Calculation of partial correlation metrics and complete correlation peaks.

The partial correlation metric is defined as follows:

Stage-I partial correlation metric:

$$Cp^{(1)}(t) = \hat{b}\left[1:\frac{L}{2}\right] y\left[\tau:\tau+\frac{L}{2}-1\right]$$

Stage-II partial correlation metric:

$$Cp^{(2)}(t) = \hat{b}\left[\frac{L}{2}+1:L\right] y\left[\tau:\tau+\frac{L}{2}-1\right]$$

The correlation metric is calculated as follows:

$$C(t) =$$

$$\hat{b}\left[1:\frac{L}{2}\right]y\left[\tau:\tau+\frac{L}{2}-1\right] + \hat{b}\left[\frac{L}{2}+1:L\right]y\left[\tau:\tau+\frac{L}{2}-1\right] = Cp^{(1)}(t) = Cp^{(2)}(t)$$

By calculating the correlation metric, $\hat{b}_{[L/2+1:L]}=-\hat{b}_{[1:L/2]}$ is obtained.

By applying $$\hat{b}_{[L/2+1:L]} = -\hat{b}_{[1:L/2]}$$

to $$C(t) = \hat{b}\left[1:\frac{L}{2}\right]y\left[\tau:\tau+\frac{L}{2}-1\right] + \hat{b}\left[\frac{L}{2}+1:L\right]y\left[\tau:\tau+\frac{L}{2}-1\right] = Cp^{(1)}(t) + Cp^{(2)}(t),$$

$$C(t) = Cp^{(1)}(t) - Cp^{(1)}(t+L/2)$$

is obtained.

In response to D denoting a number of received samples over which synchronization is to be performed, D is segmented into B blocks. Each block among the B blocks has a length of L/2, where K<L/2 denotes an integer fixed a priori. The aforementioned description relating to the receiver 200 is applicable to operations that are performed to synchronize the frame.

A time epoch is expressed as follows:

$$\hat{\tau}=\mathrm{argmax} C(k), k \in \{j\max(1), \ldots, j\max(B)\}$$

The time epoch denotes a beginning of the frame. In other words, at the beginning of the data field in the frame, the time epoch is determined as a point in time at which a cross-correlation between the transmitted data and the preamble template reaches a peak value. The maximum value of the correlation metric indicates a maximum correlation between the signal received from the transmitter 110 and the preamble sequence.

In operation 1312, the highest correlation peak is not obtained unless the signal is not detected. In operation 1316, the signal is detected upon the highest correlation peak being obtained using the preamble sequence.

Figure 14:
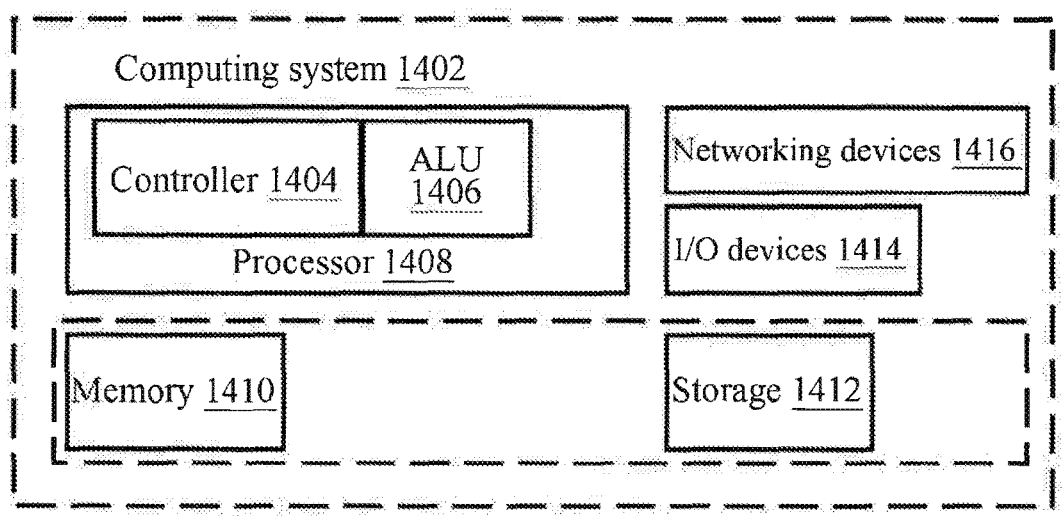
FIG. 14 is a block diagram illustrating a computing system including a method, an apparatus, and a system to construct a preamble sequence and synchronizing a frame, in accordance with an embodiment.

FIG. 14 is a block diagram illustrating a computing system including a method, an apparatus, and a system to construct a preamble sequence and synchronizing a frame, in accordance with an embodiment. Referring to FIG. 14, the computing system 1402 includes at least one processor 1408, which includes a controller 1404 and an arithmetic logic unit (ALU) 1406, a memory 1410, a storage 1412, networking devices 1416, and input/output (I/O) devices 1414. The processor 1408 is configured to process or execute functions. The controller 1404 controls the processor 1408 to execute the functions. Further, any logical and/or arithmetic operations involved in the execution of the instructions are performed using the ALU 1406.

The overall computing system 1402 is configured using homogeneous and/or heterogeneous cores. The processor 1408 executes the functions on a single chip. In accordance with an alternative embodiment, multiple processors 1408 execute functions over a plurality of chips.

The functions that include instructions and codes executed by the computing system 1402 are stored in either the memory 1410 or the storage 1412 or in both of the memory 1410 and the storage 1412. At the time of execution, the functions or instructions are retrieved from the memory 1410 and/or the storage 1412 and executed by the processor 1408.

For any hardware implementations, various networking devices 1416 or external I/O devices 1414 may be connected to the computing system 1402 to support, interoperate, or execute the functionality between the networking devices 1416 or the I/O device devices 1414.

The controller, the arithmetic logic unit, the memory, the storage, the synchronizer, the designer, and the system are hardware components and include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of a receiver, the method comprising:
generating a macro sequence using a sequence and a complementary sequence of the sequence;
configuring a preamble sequence for a communication mode by using a first micro sequence mapped to a first value in the macro sequence and by using a second micro sequence mapped to a second value in the macro sequence; and
performing a frame synchronization using the configured preamble sequence,
wherein a length of the configured preamble sequence corresponds to a product of a length of the macro sequence and a length of the first micro sequence.

2. The method of claim 1, wherein the communication mode comprises one of a coherent communication mode and a non-coherent communication mode.

3. The method of claim 1, wherein the macro sequence comprises codes, and a set of codes, among the codes, is repeated in accordance to a complementary-symmetry property.

4. The method of claim 1, wherein the configuring comprises:
configuring the preamble sequence to comprise an autocorrelation property to create a correlation peak with an autocorrelation function at a zero lag and zero autocorrelation, wherein the autocorrelation property in the preamble sequence is obtained using a pseudo random sequence.

5. A method of a receiver, the method comprising:
configuring a preamble sequence by using a first micro sequence mapped to a first value in a macro sequence and by using a second micro sequence mapped to a second value in the macro sequence; and
synchronizing, in a communication mode, a frame using the preamble sequence,
wherein the macro sequence is generated using a sequence and a complementary sequence of the sequence, and
wherein a length of the preamble sequence corresponds to a product of a length of the macro sequence and a length of the first micro sequence.

6. The method of claim 5, wherein the synchronizing of the frame comprises:
calculating a correlation metric between a signal received at the receiver and the preamble sequence;
determining correlation peak data from the correlation metric; and
calculating a time epoch parameter based on a maximum value of the correlation peak data,
wherein the time epoch is a beginning of the frame, and the maximum value is a maximum correlation between the signal and the preamble sequence.

7. The method of claim 6, wherein the correlation metric comprises a partial correlation metric.

8. The method of claim 6, wherein the correlation peak data comprises a partial correlation peak data and a complete correlation peak data.

9. The method of claim 5, wherein the macro sequence comprises codes, and a set of codes among the codes is repeated in accordance with a complementary-symmetry property.

10. The method of claim 5, wherein the communication mode comprises one of a coherent communication mode and a non-coherent communication mode.

11. A receiver, comprising:
a processor configured to
generate a macro sequence using a sequence and a complementary sequence of the sequence;
configure a preamble sequence for a communication mode by using a first micro sequence mapped to a first value in the macro sequence and by using a second micro sequence mapped to a second value in the macro sequence; and
perform a frame synchronization using the configured preamble sequence,
wherein a length of the configured preamble sequence corresponds to a product of a length of the macro sequence and a length of the first micro sequence.

12. The receiver of claim 11, wherein the macro sequence comprises codes, and a set of codes among the codes is repeated in accordance to a complementary-symmetry property.

13. The receiver of claim 11, wherein the communication mode comprises one of a coherent communication mode and a non-coherent communication mode.

14. A receiver, comprising:
a processor configured to
configure a preamble sequence by using a first micro sequence mapped to a first value in a macro sequence and by using a second micro sequence mapped to a second value in the macro sequence; and
synchronize a frame using the preamble sequence in a communication mode,
wherein the macro sequence is generated using a sequence and a complementary sequence of the sequence, and
wherein a length of the preamble sequence corresponds to a product of a length of the macro sequence and a length of the first micro sequence.

15. The receiver of claim 14, wherein the processor is further configured to calculate a correlation metric between a signal received at the receiver and the preamble sequence, to determine correlation peak data from the correlation metric, and to calculate a time epoch parameter based on a maximum value of the correlation peak data, wherein
the time epoch is a beginning of the frame, and the maximum value is a maximum correlation between the signal and the preamble sequence.

16. The receiver of claim 15, wherein the correlation metric comprises a partial correlation metric.

17. The receiver of claim 15, wherein the correlation peak data comprises at least one of partial correlation peak data and complete correlation peak data.

18. The receiver of claim 14, wherein the macro sequence comprises codes, and a set of codes among the codes is repeated in accordance with a complementary-symmetry property.

19. The receiver of claim 12, wherein the communication mode comprises one of a coherent communication mode and a non-coherent communication mode.

20. A non-transitory computer-readable medium storing program instructions for controlling a processor to perform the method of claim 1.

* * * * *